(12) United States Patent
Ting et al.

(10) Patent No.: US 7,843,535 B2
(45) Date of Patent: Nov. 30, 2010

(54) REFLECTIVE LIQUID CRYSTAL DISPLAY ASSEMBLY

(75) Inventors: Chi Lun Ting, Hsinchu County (TW); Tsung Hsien Lin, Hsinchu County (TW); Chi Chang Liao, Hsinchu County (TW); Shie Chang Jeng, Hsinchu County (TW); Yan Rung Lin, Hsinchu County (TW); Ying Guey Fuh, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 295 days.

(21) Appl. No.: 11/362,203

(22) Filed: Feb. 27, 2006

(65) Prior Publication Data

US 2007/0109471 A1    May 17, 2007

(30) Foreign Application Priority Data

Nov. 11, 2005  (TW) .............................. 94139597 A

(51) Int. Cl.
*G02F 1/1335* (2006.01)
*G02F 1/1333* (2006.01)

(52) U.S. Cl. ...................................... 349/115; 349/160
(58) Field of Classification Search ................. 349/115, 349/175, 176, 160
See application file for complete search history.

(56) References Cited

U.S. PATENT DOCUMENTS

| 4,264,149 A | 4/1981 | de Zwart et al. |
| 4,456,336 A * | 6/1984 | Chung et al. ................. 349/160 |
| 4,536,059 A * | 8/1985 | van den Berk .............. 349/168 |
| 5,399,390 A * | 3/1995 | Akins ......................... 428/1.62 |
| 6,061,107 A | 5/2000 | Yang et al. |
| 6,809,788 B2 | 10/2004 | Yamada et al. |
| 2002/0180916 A1* | 12/2002 | Schadt et al. ................ 349/117 |
| 2003/0035191 A1* | 2/2003 | Moia ........................... 359/281 |
| 2005/0007531 A1* | 1/2005 | Okada et al. ................. 349/129 |

FOREIGN PATENT DOCUMENTS

| CN | 1331429 A | 1/2002 |
| EP | 1087253 A2 | 3/2001 |
| JP | 10-31205 A | 2/1998 |
| JP | 10-90728 A | 4/1998 |
| JP | 2003-29254 A | 1/2003 |
| TW | 564323 | 12/2003 |
| WO | WO 93/23496 A1 | 11/1993 |

\* cited by examiner

*Primary Examiner*—Michael H Caley
(74) *Attorney, Agent, or Firm*—Bacon & Thomas, PLLC

(57) ABSTRACT

The present invention provides a reflective liquid crystal display assembly, which includes a first substrate, a second substrate and a liquid crystal layer sealed between them. The present invention designs a specific surface structure of at least one of the first and second substrates relative to the liquid crystal layer so that the helical axes of the cholesteric liquid crystal molecules can incline in different directions as desired in the liquid crystal layer. The reflective spectrum can be broadened and the viewing angle is widened.

17 Claims, 4 Drawing Sheets

REFLECTIVE LIQUID CRYSTAL DISPLAY ASSEMBLY

BACKGROUND OF THE INVENTION

1. Field of the Invention

The present invention relates to a reflective liquid crystal display device, and more particularly to a reflective cholesteric liquid crystal display device.

2. Description of the Related Art

The liquid crystal display device primarily includes a pair of substrates, between which a liquid crystal layer is held. When a predetermined drive voltage is applied to the liquid crystal layer to control orientations of liquid crystal molecules in the liquid crystal layer, external light incident on the liquid crystal display device is modulated to perform intended display of images or the like. The liquid crystal display device using the cholesteric liquid crystal has been known. Examples of the cholesteric liquid crystal are, e.g., liquid crystal, which exhibits the cholesteric phase by itself, and chiral nematic liquid crystal obtained by adding a chiral agent to nematic liquid crystals. The cholesteric liquid crystal has such a feature that the liquid crystal molecules forms helical structures, and can exhibit three states, i.e. a planar state, focal conic state and a homeotropic state when it is held between a pair of substrates, and is subjected to an external field. In the liquid crystal display device using the cholesteric liquid crystals, these three states exhibit different light transparencies and reflectances. Therefore, the three states and the manner of applying the external electric field can be appropriately selected to perform the display. For example, the display may be performed in the cholesteric-nematic phase transfer mode using the homeotropic state and the focal conic state, and maybe performed in a bistable mode using the planar state and the focal conic state.

Among them, the display in the bistable mode has such a feature that the planar state and the focal conic state are stable even in the state where no external electric field is applied, and thus has the bistability, which maintains the display state even when no external electric field is applied. The liquid crystal display device using the cholesteric liquid crystals exhibits the selective reflection property in the visible wavelength range when it is in the planar state, and achieves a bright reflection state. In other words, it can perform bright display without using a polarizing plate or a color filter.

The cholesteric liquid crystal having the characteristics of bistability and high reflectivity is very suitable for application in the development of the reflective black and white liquid crystal display device. Nevertheless, the reflective spectrum of the cholesteric liquid crystals is changed as different orientations of the liquid crystal molecules in the liquid crystal layer. It is an important issue to improve the wide viewing angle behavior of the liquid crystal display devices. The wavelengths of the reflective light are relevant to the pitches of the cholesteric liquid crystals. It is desired for making the helical axes of the cholesteric liquid crystal molecules in the liquid crystal layer orientate in multi-directions such that the cholesteric liquid crystals in the liquid crystal layer may have various effective pitches and the reflective spectrum can be broadened. Referring to FIG. 1, U.S. Pat. No. 6,809,788 discloses that the surfaces of the substrates relative to the liquid crystal layer are processed to make the cholesteric liquid crystal molecules proximate to the processed surfaces of the substrates orientate in multi-directions but have chaotic arrangement. U.S. Pat. No. 6,809,788 only can make the helical axes of the cholesteric liquid crystal molecules proximate to the surfaces of the substrates orientate in declining directions, but can not affect the cholesteric liquid crystal molecules in the interior of the liquid crystal layer. There is limited effect to broaden the viewing angle.

Accordingly, it is an intention to provide an improved cholesteric liquid crystal display structure, which can overcome the above drawbacks.

SUMMARY OF THE INVENTION

One objective of the present invention is to provide a reflective liquid crystal display assembly, which utilizes the specific surface structures of substrates to make the helical axes of the cholesteric liquid crystal molecules incline in different directions so as to broaden the reflection spectrum and evenly diffuse the reflective light toward multi-angles to produce a wide viewing angle effect.

It is another objective of the present invention to provide a reflective liquid crystal display assembly, which utilizes the specific surface structures of the substrates relative to the liquid crystal layer to make the reflective light evenly diffuse toward multi-angles and hence mix to become white light such that the present reflective liquid crystal display assembly is suitable for manufacturing the white and black reflective liquid crystal display device without additional elements.

It is still another objective of the present invention to provide a reflective liquid crystal display assembly, which utilizes the surface structures of the substrates relative to the liquid crystal layer to make the reflective light with specific wavelengths evenly diffuse toward multi-angles, and advantageously producing a color liquid crystal display device with wide viewing angles.

It is a further objective of the present invention to provide a reflective liquid crystal display assembly, which doe not require polarizers, color filters and backlights, etc. so as to decrease power consumption.

According to the above objectives, the present invention provides a reflective liquid crystal display assembly including a first substrate, a second substrate and a liquid crystal layer having cholesteric liquid crystals sealed between them. At least one of the first substrate and second substrate has a surface relative to the liquid crystal layer is formed with one at least two-dimensional texture structure.

The present invention utilizes the specific structure of at least one surface of the substrates relative to the liquid crystal layer to make the helical axes of the cholesteric liquid crystals incline in different directions as desired in the liquid crystal layer to broaden the reflection spectrum and widen the viewing angles.

DETAILED DESCRIPTION OF THE PREFERRED EMBODIMENTS

Figure 1:
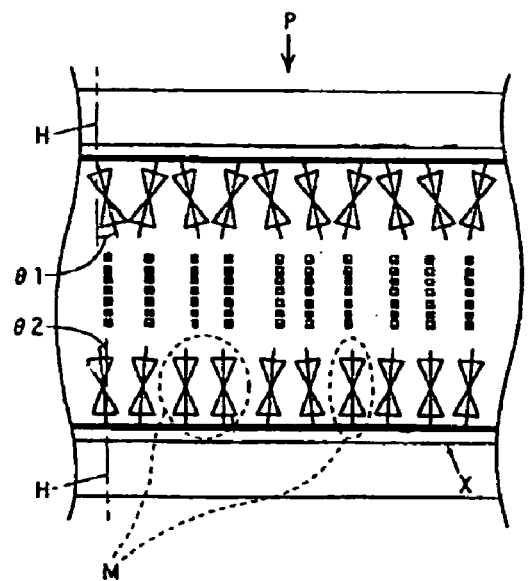
FIG. 1 is a schematic cross-sectional view of a conventional reflective liquid crystal display device.

The arrangement of the cholesteric liquid crystal molecules forms a helical periodic structure. This kind of periodic structures makes the incident light with certain range of wavelengths to generate Bragg's reflection ($\lambda$=np, n is an average refractive index of the cholesteric liquid crystals, p is the pitch of the cholesteric liquid crystals). As such, the reflective light generally is a single-color light residing in a small section of the spectrum. The wavelength of the reflective light is related to the pitch length of the cholesteric liquid crystals. As the pitch length increases, the peak of the reflective spectrum shifts toward longer wavelengths. The spectrum of the reflective light is also broadened. When the helical axis of the cholesteric liquid crystal molecule inclines in a $\theta_{CLC}$ angle relative to the normal line of the substrate, the inclination of the helical axis makes the vertical incident light feel a shortened effective pitch length. When the inclination angle $\theta_{CLC}$ becomes larger, the peak of the reflective spectrum shifts toward shorter wavelengths. As such, different inclination angles $\theta_{CLC}$ of the helical axes result in different reflective lights. It is expectable that the spectrum of the reflective light would be broadened when the pitches of the cholesteric liquid crystals change as the different places where the cholesteric liquid crystal molecules position.

The present invention provides a design of the substrate surface structure such that the inclination angle $\theta_{CLC}$ of the helical axis of the cholesteric liquid crystal molecule in the liquid crystal layer changes as the surface profile of the substrate changes. The helical axes of the cholesteric liquid crystal molecules in different regions of the liquid crystal layer would point to different directions as the surface profile of the substrate varies. As a result, the cholesteric liquid crystal molecules in the liquid crystal layer have various effective pitch lengths. The spectrum of the reflective light is thus broadened. Moreover, by the design of the surface structure of the substrate the Bragg's reflection is contributed to multi-angles, and the reflective light is evenly distributed to the multi-angles, which advantageously forms the wide viewing angle effect.

More specifically, the present invention forms at least one two-dimensional large texture structure on a surface of the substrate relative to the liquid crystal layer. As such, the cholesteric liquid crystal molecules in different regions of the liquid crystal layer sense different surface profiles of the substrate. The inclination angles $\theta_{CLC}$ of the helical axes of the liquid crystal molecules thus are changed to conform to the surface profiles of the substrate. As a consequence, the helical axes of the liquid crystal molecules in different regions of the liquid crystal layer point to different directions. By the large texture structure of the surface of the substrate the Bragg's reflection is contributed to multi-angles and the reflective light is evenly diffused toward the multi-angles to form the wide viewing angle effect.

Moreover, the surface configuration of the substrate can be formed by the photolithography method, printing or the pressing mold method. The liquid crystals are dropped in the space between the two substrates by the one drop filling (ODF) method or ink jet, etc.

The present invention will be described in detail in accordance with the following preferred embodiments accompanying with the drawings.

Figure 2:
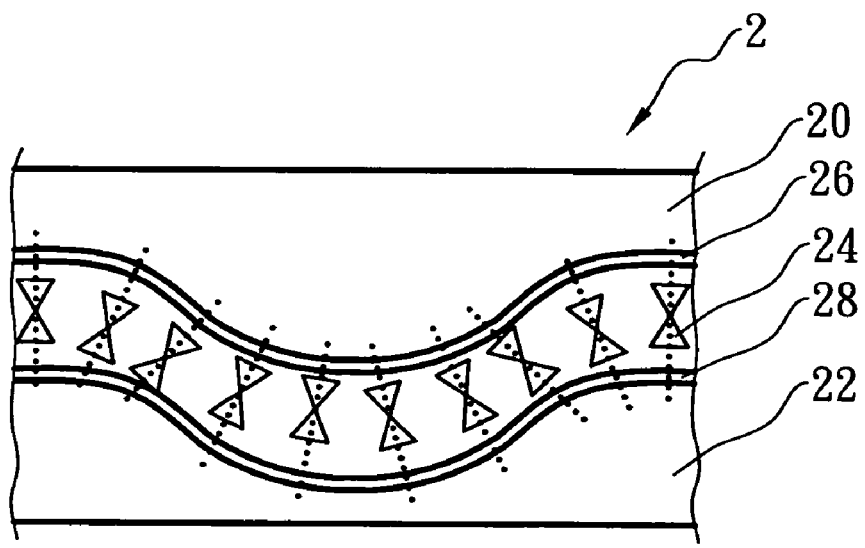
FIG. 2 is a schematic cross-sectional view of a unit structure of the present reflective liquid crystal display assembly according to a first embodiment of the present invention.
Figure 3:
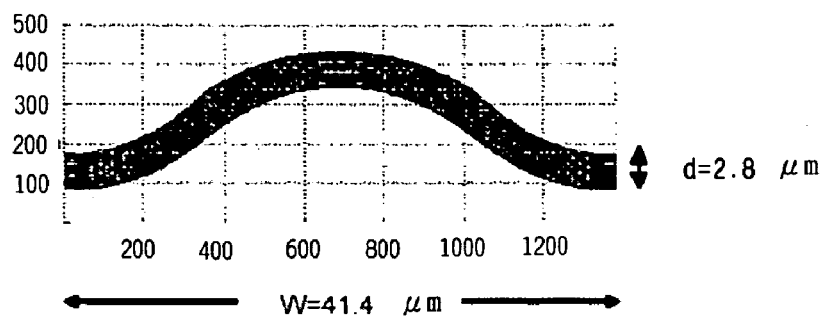
FIG. 3 is a schematic cross-sectional view of a one-period two-dimensional wave-shaped surface structure of a substrate according to the first preferred embodiment.
Figure 4A:
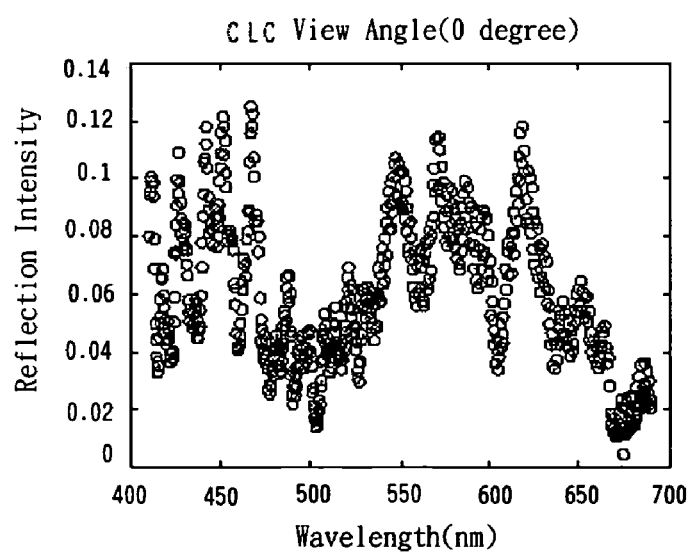
FIGS. 4A through 4D is respectively the reflective spectrums of the present reflective liquid crystal display assembly according to the first embodiment in different viewing angles.
Figure 4B:
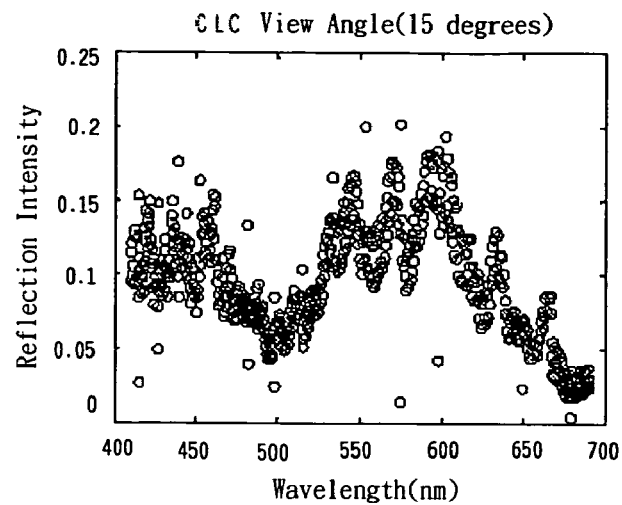
Figure 4C:
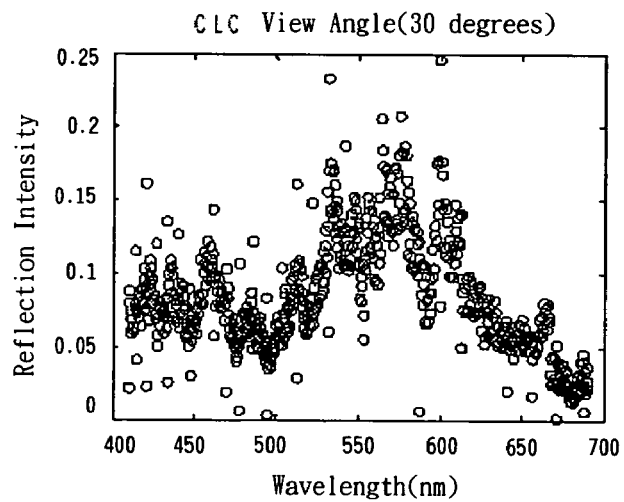
Figure 4D:
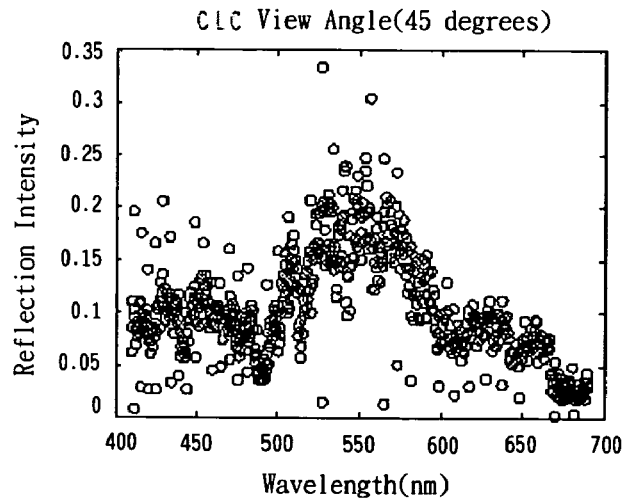

FIG. 2 is a schematic cross-sectional view of a unit structure of the present reflective liquid crystal display assembly 2 according to a first preferred embodiment of the present invention. The unit structure of the reflective liquid crystal display assembly 2 corresponds to a pixel unit. In the first preferred embodiment, the reflective liquid crystal display assembly 2 includes a first substrate 20, a second substrate 22 and a liquid crystal layer having the cholesteric liquid crystal molecules 24 interposed between the first substrate 20 and the second substrate 22. Both the surfaces of the first substrate 20 and second substrate 22 relative to the liquid crystal layer have a two-dimensional wave-shaped periodic structure. The two-dimensional wave-shaped structures of the first substrate 20 and second substrate 22 are matched to each other. Referring to FIG. 3, the two-dimensional wave-shaped structures have a one-period length of 41.4 µm, which corresponds to a pixel unit. The wave-shaped surfaces of the substrates have a largest inclination angle of 40 degrees. The distance between the first substrate 20 and second substrate 24 is 2.8 µm. The cholesteric liquid crystal molecules filled between the first substrate 20 and second substrate 24 has a pitch of 350 nm and the pitch number is 8. Referring to FIG. 2 again, the cholesteric liquid crystal molecules 24 would adjust their helical axes orientations as the surface profiles of the first substrate 20 and the second substrate 24 corresponding to the positions where the liquid crystal molecules 24 place. As a result, the helical axes of the cholesteric liquid crystal molecules 24 would point to multi-directions in the liquid crystal layer.

Moreover, it is preferable that the surfaces of the first substrate 20 and the second substrate 24 are respectively formed with an electrode layer 26, 28 to advantageously apply an electric field upon the liquid crystal layer.

FIGS. 4A through 4D shows the reflective spectrum of the present reflective liquid crystal display assembly 2 in the ambient lighting conditions under which the incidence angle of the ambient light relative to the normal line of the substrate is respectively 0 degree, 15 degrees, 30 degrees and 45 degrees. However, the reflective spectrum in the view angles of −15 degrees, −30 degrees and −45 degrees are respectively similar to the reflective spectrum in view angles of 0 degree, 15 degrees, 30 degrees and 45 degrees. The reflective spectra of FIGS. 4A through FIG. 4D apparently reveal that the reflective spectra from different viewing angles can become consistent and the reflective spectra can extend to cover the whole visible-light wavelengths. The intensities of these reflective spectra are slightly different. It is proved that the two-dimensional wave-shaped structures of the surfaces of the first substrate 20 and the second substrate 24 relative to the liquid crystal layer can make the reflective light being evenly diffused in multi-directions. As a result, the white light resulting from the mixed lights can be obtained in the multi-directions.

The present reflective liquid crystal display assembly 2 also can use a first planar substrate 20 and second planar substrate 22, and forming an interface layer with a two-dimensional wave-shaped periodic structure on the respective surfaces of the first planar substrate 20 and the second planar substrate 22 relative to the liquid crystal layer. Then, an electrode layer is formed on the respective surfaces of the first planar substrate 20 and the second planar substrate 22 so as to advantageously apply an electric field upon the liquid crystal layer.

Figure 5:
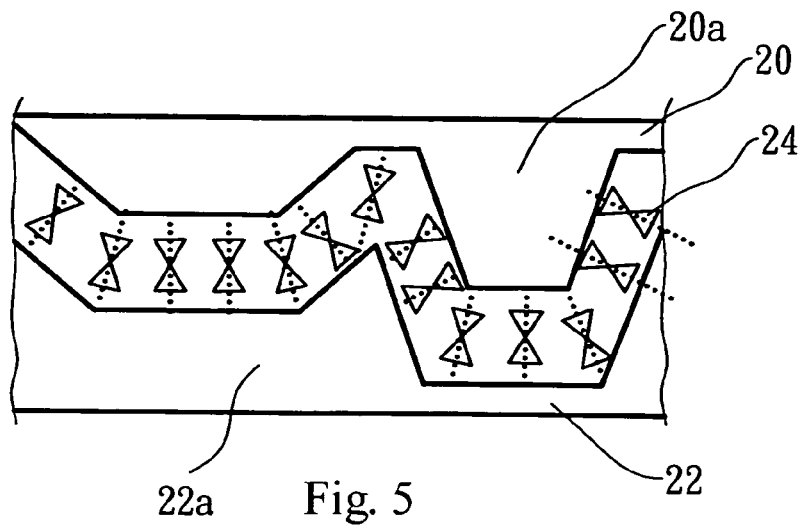
FIG. 5 is a schematic cross-sectional view of a unit structure of the present reflective liquid crystal display assembly according to a second embodiment of the present invention.

FIG. 5 is a schematic cross-sectional view of a unit structure of the present reflective liquid crystal display assembly according to a second preferred embodiment of the present invention. In the second preferred embodiment, the respective surfaces of the first substrate 20 and second substrate 22 relative to the liquid crystal layer have a periodic structure different from that of the first preferred embodiment. In the second preferred embodiment, the surface of the first substrate 20 relative to the liquid crystal layer is formed with various-sized first trapezoid bodies 20a and the surface of the second substrate 22 relative to the liquid crystal layer is formed with various-sized second trapezoid bodies 22a that are counterparts of the first trapezoid bodies 20a. The various-sized first trapezoid bodies 20a constitute a periodic structure, and the various-sized second trapezoid bodies 22a also constitute a periodic structure. By the periodic structures formed on the respective surfaces of the first substrate 20 and second substrate 22 according to the second preferred embodiment the helical axes of the cholesteric liquid crystal molecules 24 point to different directions such that the cholesteric liquid crystal molecules 24 have various effective pitches in the liquid crystal layer. As a result, the reflective spectrum is broadened and the reflective light is evenly diffused toward multi-angles, which advantageously forms white light toward various viewing angles.

In the second preferred embodiment, the present reflective liquid crystal display assembly also can use a first planar substrate 20 and second planar substrate 22, and forming an interface layer with the aforesaid periodic structure on the respective surfaces of the first planar substrate 20 and the second planar substrate 22 relative to the liquid crystal layer.

Figure 6:
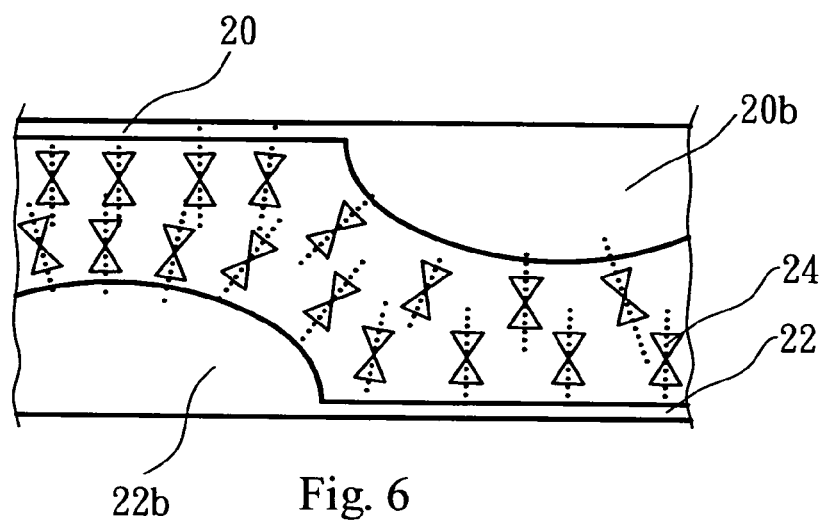
FIG. 6 is a schematic cross-sectional view of a unit structure of the present reflective liquid crystal display assembly according to a third embodiment of the present invention.

FIG. 6 is a schematic cross-sectional view of a unit structure of the present reflective liquid crystal display assembly according to a third preferred embodiment of the present invention. The respective surfaces of the first substrate 20 and second substrate 22 relative to the liquid crystal layer are formed with a plurality of spherical protrusions 20b, 22b. The positions of the spherical protrusions 20b and spherical protrusions 22b have a diagonal relationship. By the spherical protrusions 20b, 22b formed on the first substrate 20 and second substrate 22 the helical axes of the cholesteric liquid crystal molecules 24 placed in different regions of the liquid crystal layer point to different directions. The reflection spectrum is hence broadened and the reflective light is evenly diffused toward various angles, which advantageously forms white light toward various viewing angles.

In the third preferred embodiment, the present reflective liquid crystal display assembly also can use a first planar substrate 20 and second planar substrate 22, and forming an interface layer with the aforesaid spherical protrusions 20b and 22b on the respective surfaces of the first planar substrate 20 and the second planar substrate 22 relative to the liquid crystal layer.

In addition, the present reflective liquid crystal display assembly is suitable for the manufacture of a color liquid crystal display device. In view of a unit structure of the present reflective liquid crystal display assembly corresponding to a pixel unit having a red sub-pixel, green sub-pixel and a blue sub-pixel, the respective surfaces of the first substrate 20 and second substrate 22 can be formed with a two-dimensional periodic texture structure formed of three sub-periodic texture structures respectively corresponding to the red sub-pixel, green sub-pixel and the blue sub-pixel. The respective surfaces having the periodic texture structures of the first substrate 20 and second substrate 22 can be formed with an electrode layer having a plurality of sub-electrodes respectively corresponding to the red sub-pixels, green sub-pixels and the blue sub-pixels. As such, respective applied electric fields can be added upon these sub-pixels to advantageously manufacture the color reflective liquid crystal display device.

Figure 7:
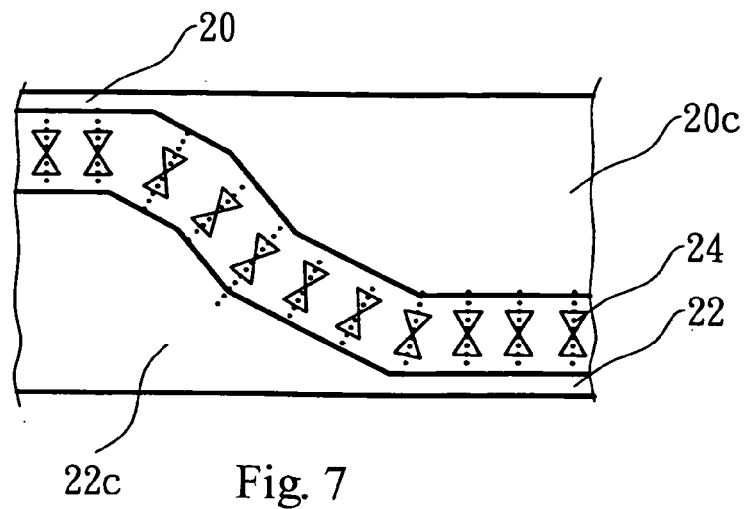
FIG. 7 is a schematic cross-sectional view of a unit structure of the present reflective liquid crystal display assembly according to a fourth embodiment of the present invention.

FIG. 7 is a schematic cross-sectional view of a unit structure of the present reflective liquid crystal display assembly according to a fourth preferred embodiment of the present invention. The respective surfaces of the first substrate 20 and second substrate 22 relative to the liquid crystal layer are formed with a periodic structure formed of a plurality of irregular protrusions 20c, 22c. The positions of the irregular protrusions 20c on the surface of the first substrate 20 and the irregular protrusions 22c on the surface of the second substrate 22 have a diagonal relationship. The surface configurations of the first substrate 20 and second substrate 22 according to the fourth preferred embodiment can make the reflection spectrum of the present reflective liquid crystal display assembly broadened, and also make the reflective light have a largest intensity toward a specific viewing angle. The fourth preferred embodiment is suitable for the reflective liquid crystal display device requiring the specific viewing angle.

In the fourth preferred embodiment, the present reflective liquid crystal display assembly also can use a first planar substrate 20 and second planar substrate 22, and forming an interface layer with the aforesaid irregular protrusions 20c and 22c on the respective surfaces of the first planar substrate 20 and the second planar substrate 22 relative to the liquid crystal layer. The present reflective liquid crystal display assembly utilizes the two-dimensional texture structures formed on the respective surfaces of the substrates relative to the liquid crystal layer to broaden the reflection spectrum to cover the whole visible-light range. The reflective light is also evenly diffused so as to widen the viewing angle. The present reflective liquid crystal display assembly is advantageous for the development of the wide viewing angle color liquid crystal display device as well as the white and black liquid crystal display device.

While the invention has been described by way of examples and in terms of preferred embodiments, it is to be understood that those who are familiar with the subject art can carry out various modifications and similar arrangements and procedures described in the present invention and also achieve the effectiveness of the present invention. Hence, it is to be understood that the description of the present invention should be accorded with the broadest interpretation to those who are familiar with the subject art, and the invention is not limited thereto.

What is claimed is:

1. A reflective liquid crystal display assembly, comprising:
   a first substrate;
   a second substrate;
   a liquid crystal layer sealed between said first substrate and said second substrate, said liquid crystal layer including cholesteric liquid crystal molecules; and
   two interlace layers respectively formed on one surface of each of said first substrate and said second substrate relative to said liquid crystal layer, wherein facing surfaces of said interface layers are formed with at least two-dimensional texture with the facing surfaces of said interface layers conforming to each other, and normal lines of neighboring portions in one dimension of each said interface layer point to different directions and provided with an electrode layer thereon conforming to the two-dimensional texture.

2. The reflective liquid crystal display assembly as claimed in claim 1, wherein the two-dimensional texture is a periodic structure.

3. The reflective liquid crystal display assembly as claimed in claim 2, wherein the two-dimensional texture makes helical axes of said cholesteric liquid crystal molecules in different regions of said liquid crystal layer inclining in different directions.

4. The reflective liquid crystal display assembly as claimed in claim 2, wherein the periodic structure includes three sub-periodic structures.

5. The reflective liquid crystal display assembly as claimed in claim 1, wherein the two-dimensional texture makes helical axes of said cholesteric liquid crystal molecules in different regions of said liquid crystal layer inclining in different directions.

6. The reflective liquid crystal display assembly as claimed in claim 1, wherein both the facing surfaces of said interface layers have a two dimensional wave-shaped periodic structure comforming to each other.

7. The reflective liquid crystal display assembly as claimed in claim 6, wherein the distance between the first and second substrates is 2.8 µm.

8. The reflective liquid crystal display assembly as claimed in claim 6, wherein the cholesteric liquid crystal molecules has a pitch of 350 nm and pitch number is 8.

9. A reflective liquid crystal display assembly, comprising:
   a first substrate;
   a second substrate; and
   a liquid crystal layer sealed between said first substrate and said second substrate, said liquid crystal layer including cholesteric liquid crystal molecules;
   wherein both of facing surfaces of said first substrate and said second substrate relative to said liquid crystal layer are formed with at least two-dimensional texture with the two facing surfaces conforming to each other, and normal lines of neighboring portions in one dimension of each of said two facing surfaces point to different directions, an electrode layer is provided on and conforming to each of said two facing surfaces of said substrates.

10. The reflective liquid crystal display assembly as claimed in claim 9, wherein both the facing surfaces of said substrates have a two dimensional wave-shaped periodic structure conforming to each other.

11. The reflective liquid crystal display assembly as claimed in claim 9, wherein the two-dimensional texture is a periodic structure.

12. The reflective liquid crystal display assembly as claimed in claim 11, wherein the two-dimensional texture makes helical axes of said cholesteric liquid crystal molecules in different regions of said liquid crystal layer inclining in different directions.

13. The reflective liquid crystal display assembly as claimed in claim 11, wherein the periodic structure includes three sub-periodic structures.

14. The reflective liquid crystal display assembly as claimed in claim 9, wherein the two-dimensional texture makes helical axes of said cholesteric liquid crystal molecules in different regions of said liquid crystal layer inclining in different directions.

15. The reflective liquid crystal display assembly as claimed in claim 9, wherein both of the facing surfaces of said substrates have two-dimensional various-sized trapezoid bodies or two-dimensional irregular protrusions.

16. A reflective liquid crystal display assembly, comprising:
   a first substrate;
   a second substrate;
   a liquid crystal layer sealed between said first substrate and said second substrate, said liquid crystal layer including cholesteric liquid crystal molecules; and
   two interface layers respectively formed on one surface of each of said first substrate and said second substrate relative to said liquid crystal layer, facing surfaces of said interface layers formed with a plurality of projections thereon with the projections of said interface layers being in one-to-one diagonal relationship so that normal lines of neighboring portions in one dimension of each said interface layer point to different directions and each said interface layer is provided with an electrode layer thereon conforming to the two-dimensional texture.

17. A reflective liquid crystal display assembly, comprising:
   a first substrate;
   a second substrate; and
   a liquid crystal layer sealed between said first substrate and said second substrate, said liquid crystal layer including cholesteric liquid crystal molecules;
   wherein both of facing surfaces of said first substrate and said second substrate relative to said liquid crystal layer are formed with a plurality of projections thereon with the projections of said substrates being in one-to-one diagonal relationship so that normal lines of neighboring portions in one dimension of each of said two facing surfaces point to different directions, an electrode layer is provided on, and conforming to each of said two facing surfaces of said substrates.

* * * * *